(12) United States Patent
Goldstein et al.

(10) Patent No.: US 10,594,191 B2
(45) Date of Patent: Mar. 17, 2020

(54) ROTOR ENDPLATE FOR ELECTRIC MACHINE

(71) Applicant: Ford Global Technologies, LLC, Dearborn, MI (US)

(72) Inventors: Cyrille Goldstein, Ferndale, MI (US); Joel Hetrick, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 15/469,809

(22) Filed: Mar. 27, 2017

(65) Prior Publication Data

US 2018/0278126 A1    Sep. 27, 2018

(51) Int. Cl.
| | |
|---|---|
| *H02K 5/20* | (2006.01) |
| *H02K 9/193* | (2006.01) |
| *H02K 7/00* | (2006.01) |
| *H02K 9/19* | (2006.01) |
| *H02K 1/32* | (2006.01) |
| *H02K 9/00* | (2006.01) |

(52) U.S. Cl.
CPC .............. *H02K 9/193* (2013.01); *H02K 1/32* (2013.01); *H02K 5/20* (2013.01); *H02K 7/006* (2013.01); *H02K 9/19* (2013.01); *H02K 9/00* (2013.01)

(58) Field of Classification Search
CPC ............ H02K 9/193; H02K 1/32; H02K 5/20; H02K 7/006; H02K 9/19; H02K 15/022; H02K 1/148; H02K 9/00; F28F 25/06; F28F 27/02; F28F 3/042; F28F 9/00; F28F 9/027

USPC ............................................................ 310/52
See application file for complete search history.

(56) References Cited

U.S. PATENT DOCUMENTS

| | | | | |
|---|---|---|---|---|
| 3,459,979 A | * | 8/1969 | Carew ...................... | H02K 3/20 310/183 |
| 7,646,119 B2 | | 1/2010 | Schmidt | |
| 8,129,874 B2 | * | 3/2012 | Lambka ................... | H02K 5/20 310/53 |
| 10,116,178 B2 | * | 10/2018 | Horii ........................ | H02K 1/32 |
| 2002/0182054 A1 | * | 12/2002 | Entrican, Jr. ............. | F01D 1/36 415/90 |
| 2012/0055193 A1 | * | 3/2012 | Fukasaku .............. | F04C 23/008 62/468 |
| 2013/0069476 A1 | * | 3/2013 | Lyons ................ | H02K 15/0012 310/211 |
| 2014/0117795 A1 | | 5/2014 | Dedrich | |
| 2014/0175917 A1 | * | 6/2014 | Dedrich ................... | H02K 9/19 310/54 |

FOREIGN PATENT DOCUMENTS

| | | | |
|---|---|---|---|
| DE | 102015015797 A1 | 8/2016 | |
| JP | WO2015019402 | * 12/2015 | ............... H02K 1/32 |

\* cited by examiner

*Primary Examiner* — Terrance L Kenerly
(74) *Attorney, Agent, or Firm* — David Kelley; Brooks Kushman, P.C.

(57) ABSTRACT

An electric machine is provided. The electric machine may include a rotor disposed on a shaft and an endplate. The endplate may define a coolant capture ring. The coolant capture ring may have tapered side walls that extend from an outer portion of the endplate toward the shaft at a periphery thereof. The coolant capture ring may be configured to deflect coolant captured by the coolant capture ring and expelled by the shaft due to centrifugal forces associated with the rotation of the shaft.

19 Claims, 5 Drawing Sheets

ROTOR ENDPLATE FOR ELECTRIC MACHINE

TECHNICAL FIELD

The present disclosure relates to electric machines, for use with electric and hybrid-electric vehicles, capable of acting either as a motor or as a generator.

BACKGROUND

Vehicles such as battery-electric vehicles and hybrid-electric vehicles contain a traction-battery assembly to act as an energy source. The traction-battery assembly, for example, is electrically connected to an electric machine that provides torque to driven wheels. The traction-battery assembly may include components and systems to assist in managing vehicle performance and operations. It may also include high-voltage components, and an air or liquid thermal-management system to control temperature.

Electric machines typically include a stator and a rotor that cooperate to convert electrical energy into mechanical motion or vice versa. Electric machines may include thermal-management systems to cool the stator, rotor, or both.

SUMMARY

According to one embodiment of this disclosure, an electric machine is provided. The electric machine may include a rotor disposed on a shaft and an endplate. The endplate may define a coolant capture ring. The coolant capture ring may have tapered side walls that extend from an outer portion of the endplate toward the shaft at a periphery thereof. The coolant capture ring may be configured to deflect coolant captured by the coolant capture ring and expelled by the shaft due to centrifugal forces associated with the rotation of the shaft.

According to another embodiment of this disclosure, an electric machine is provided. The electric machine may include a rotor disposed on a shaft and an endplate. The endplate may define a coolant capture ring. The coolant capture ring may have tapered side walls that extend from an outer portion of the endplate toward the shaft at a periphery thereof. The electric machine may also include at least one nozzle disposed within the endplate. The coolant capture ring may be configured to deflect coolant expelled by the nozzle along a length of the rotor.

According to yet another embodiment of this disclosure, an electric machine is provided. The electric machine may include a rotor disposed on a shaft and an endplate. The endplate may include a coolant capture ring that has tapered side walls extending from an inner periphery towards the shaft. The endplate may also include a centering plate extending from the inner periphery and it may define a plurality of slots. The plurality of slots may be circumferentially offset from the inner periphery. The coolant capture ring may redirect fluid expelled by the shaft to the plurality of slots.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Electric machines typically include a stator and a rotor that cooperate to convert electrical energy into mechanical motion or vice versa. Electric machines may include thermal-management systems to cool the stator, rotor, or both. Additionally, to reduce fuel consumption and vehicle emissions, it advantageous to design light weight components. One or more aspects of this disclosure aims at improving cooling of the electric machine while reducing weight.

Figure 1:
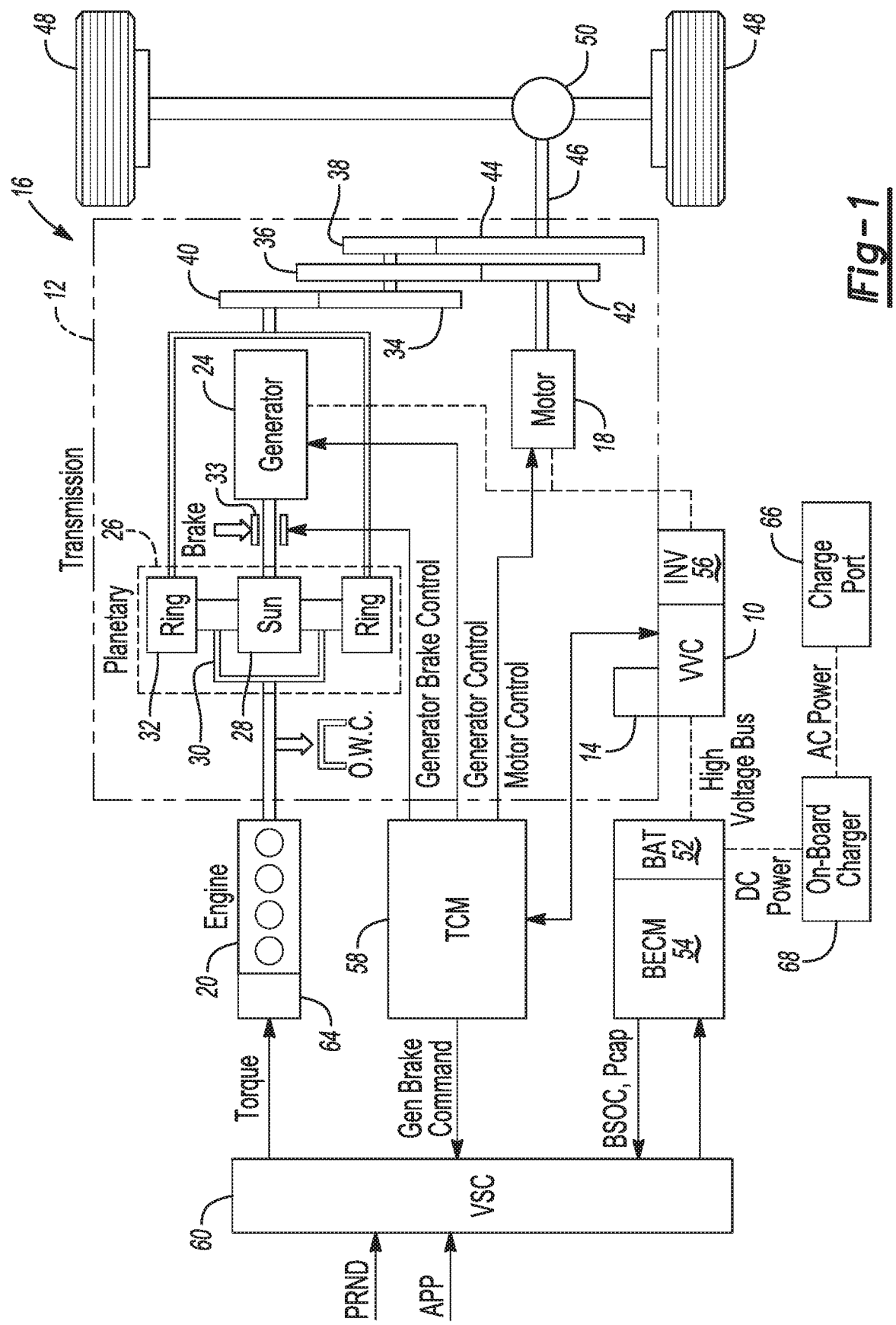
FIG. 1 is a schematic diagram of an example hybrid vehicle according to one embodiment of this disclosure.

Referring to FIG. 1, an example plugin-hybrid-electric vehicle (PHEV) is depicted and referred to generally as a vehicle 16. The vehicle 16 includes a transmission 12 and is propelled by at least one electric machine 18 with selective assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the electric machines 18, 24 may be implemented on other types of electric vehicles, such as a hybrid-electric vehicle or a fully electric vehicle.

Figure 2:
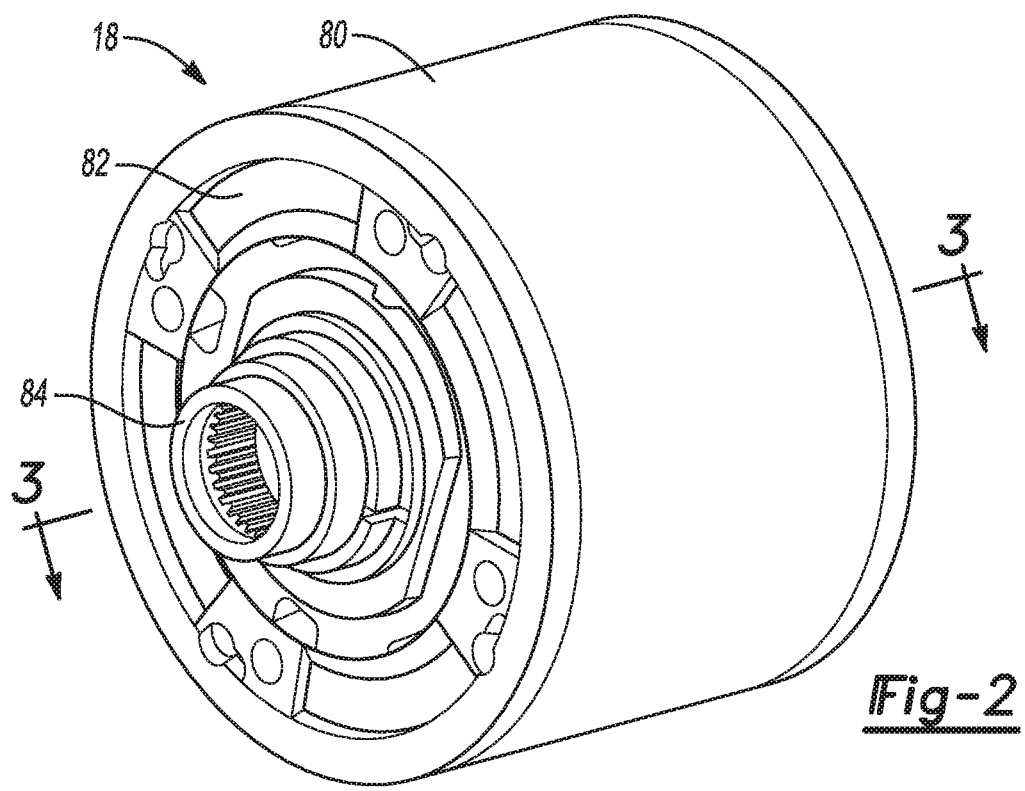
FIG. 2 is a perspective view of an example electric motor according to one embodiment of this disclosure.
Figure 4:
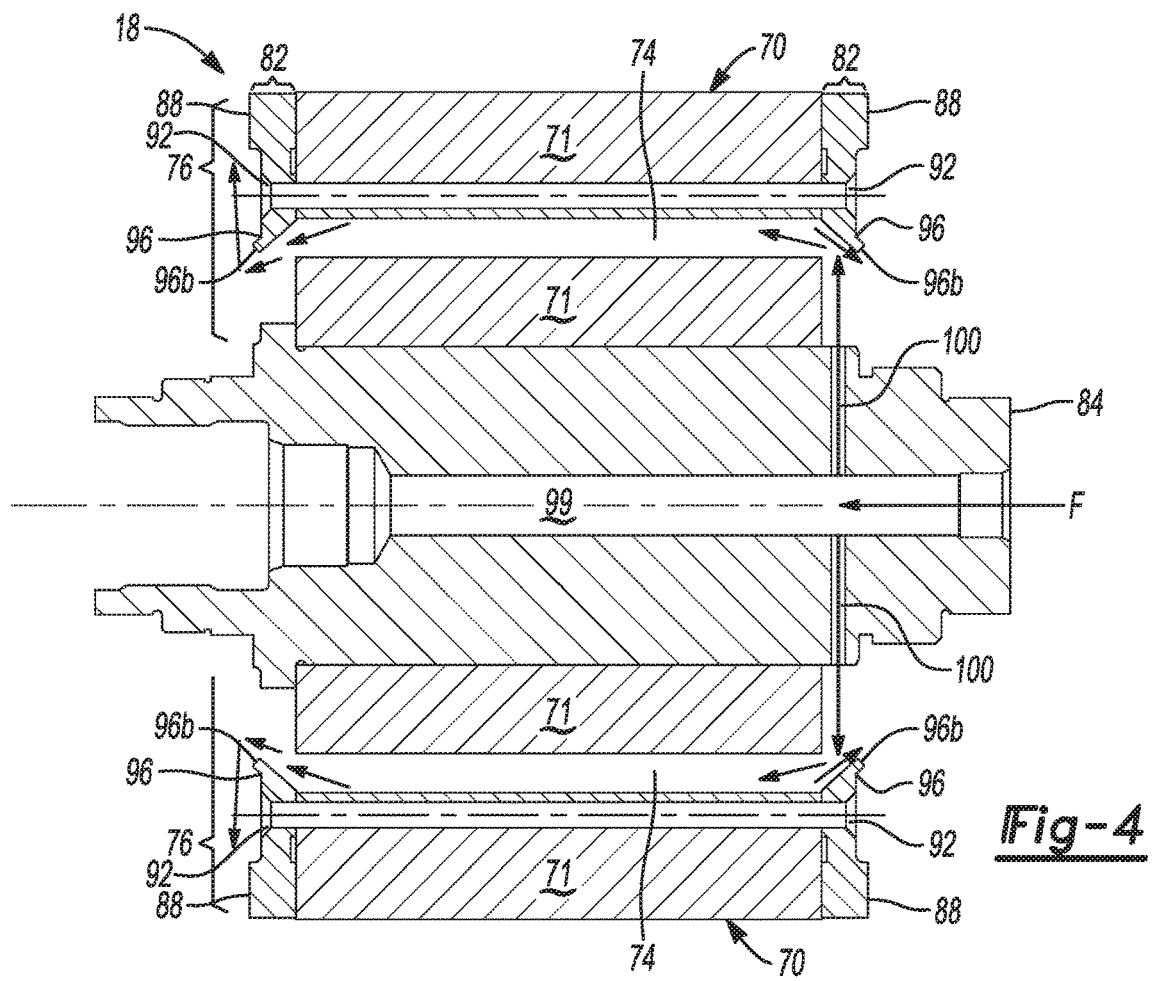
FIG. 4 is a cross-sectional view of an electric machine according to one embodiment of this disclosure.

Referring to FIG. 2, an example electric machine 18 according to one embodiment of this disclosure is illustrated. The electric machine 18 includes a cover 80 that extends between the endplates and encloses the internal components of the electric machine 18. A rotor 70 is disposed within the cover 80. The rotor is comprised of a plurality of laminations 71 that are fixed to a shaft 84 (FIG. 4). The rotor is coupled to the shaft 84 that is operably connected to the gearbox. When current is applied to the stator, a magnetic field is created causing the rotor 70 to spin within the stator, generating torque that is supplied to the gearbox via one or more shafts. During operation, the electric machine 18 generates heat within the rotor 70 and the stator (not shown). To prevent overheating of the electric machine, a coolant circuit may be provided to remove heat generated during operation.

Each of the laminations 71 may include a yoke region 76 defined between the outer diameter of the rotor 70 and the shaft 84. A plurality of coolant apertures 74 may be defined in the yolk region 76 of each of the laminations 71. The apertures 74 extend through the thickness of the laminations 71. When stacked, the apertures 74 of each lamination 71 are aligned with adjacent laminations to define rotor cooling channels 74 extending through the rotor 70.

Figure 3:
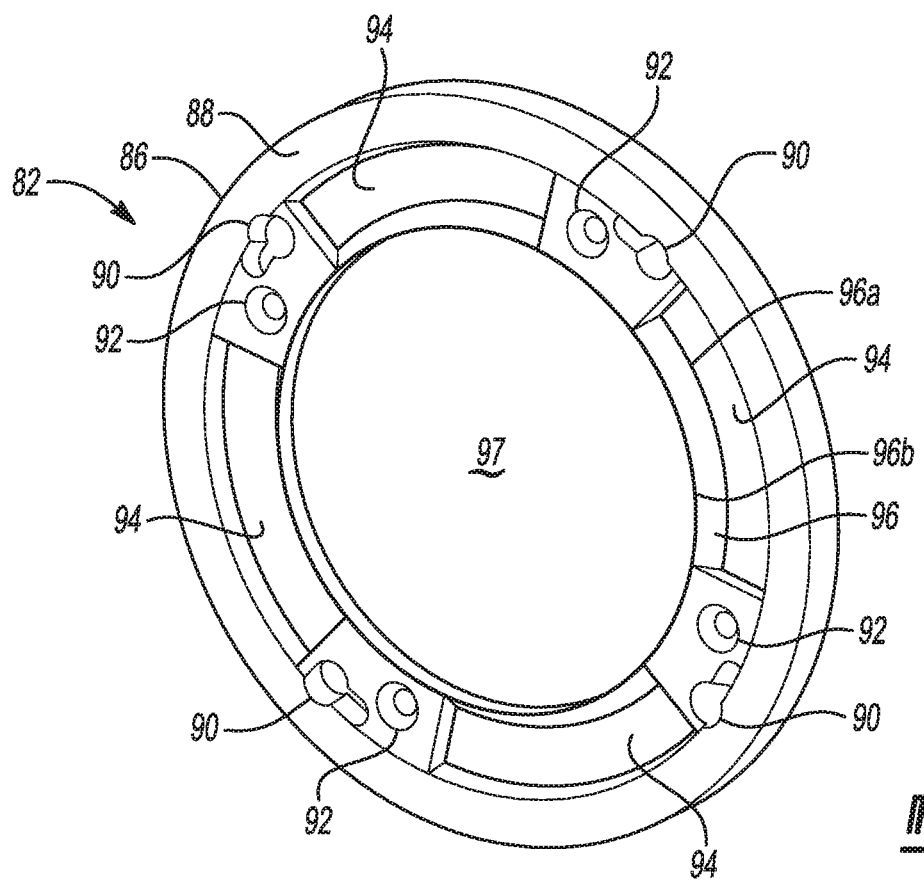
FIG. 3 is a perspective view of an example rotor endplate according to one embodiment of this disclosure.

Referring to FIG. 3, a front perspective view of the rotor endplate 82 is illustrated. The endplate includes a balance ring 88 defining an outer periphery 86 of the endplate 82. The balance ring may provide a uniform weight distribution to help with balancing the rotational forces associated with the rotation of the shaft 84 and endplates 82. The balance ring 88 may include assembly lift points 90. The assembly lift points may be utilized to allow a robotic arm or other suitable assembly equipment to pick up and place the electric machine 18 within the transmission 12 (FIG. 1). The endplates may be attached by rivets at the rivet attachment holes 92 or any other suitable mechanical fastener. The endplates may be comprised of aluminum or any other suitable material. The endplates may be made from a variety of different casting processes such as but not limited to high pressure die casting, sand casting, plaster mold casting, shell molding, and investment casting.

A coolant capturing ring 96 is disposed around the center hole 97 and is spaced apart from the balance ring 88. The coolant capturing ring 96 may have tapered walls that extend around the center hole 97 and extend from a bottom portion 96a of the coolant capturing ring 96 to a top portion 96b of the coolant capturing ring 96. The tapered walls are angled towards the center aperture 97 and away from the balance ring 88. The coolant capturing ring may also have a frustoconical shape.

Referring to FIG. 4, a cross-sectional view taken along the cross-sectional line 3 of FIG. 2 is illustrated. As electricity is applied to the stator, a magnetic field acts upon the rotor causing it to spin. Coolant may flow along the directional arrow F through a center channel 99 defined by the shaft 84. As the rotor 70 spins, the shaft 84 spins. As the shaft spins, centrifugal forces act upon the coolant that enters the channel 99 causing the coolant to flow through the vertical coolant passages 100. As the coolant exits the coolant passages 100, it may have a substantially vertical component, that is transverse to the axis of rotation of the shaft 84. The coolant then comes into contact with the coolant capture ring 96. The coolant capture ring redirects the coolant from a vertical component to a horizontal component so it moves along the coolant passage or channel 74.

Figure 5:
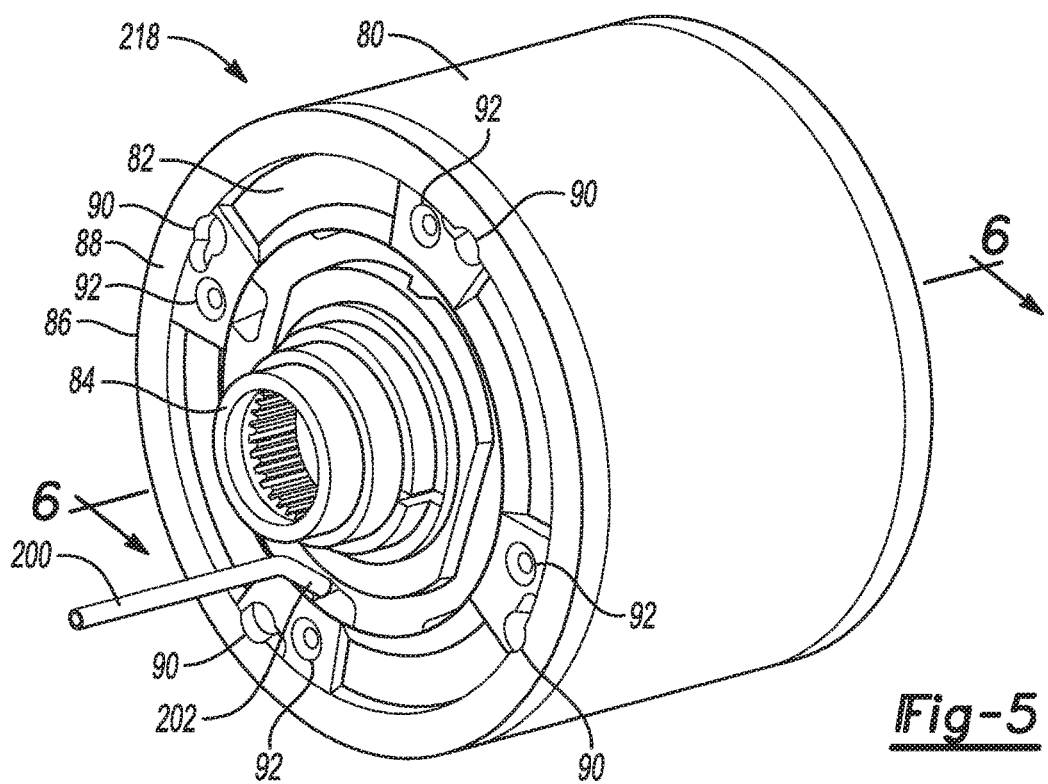
FIG. 5 is a perspective view of an example electric machine according to another embodiment of this disclosure.
Figure 6:
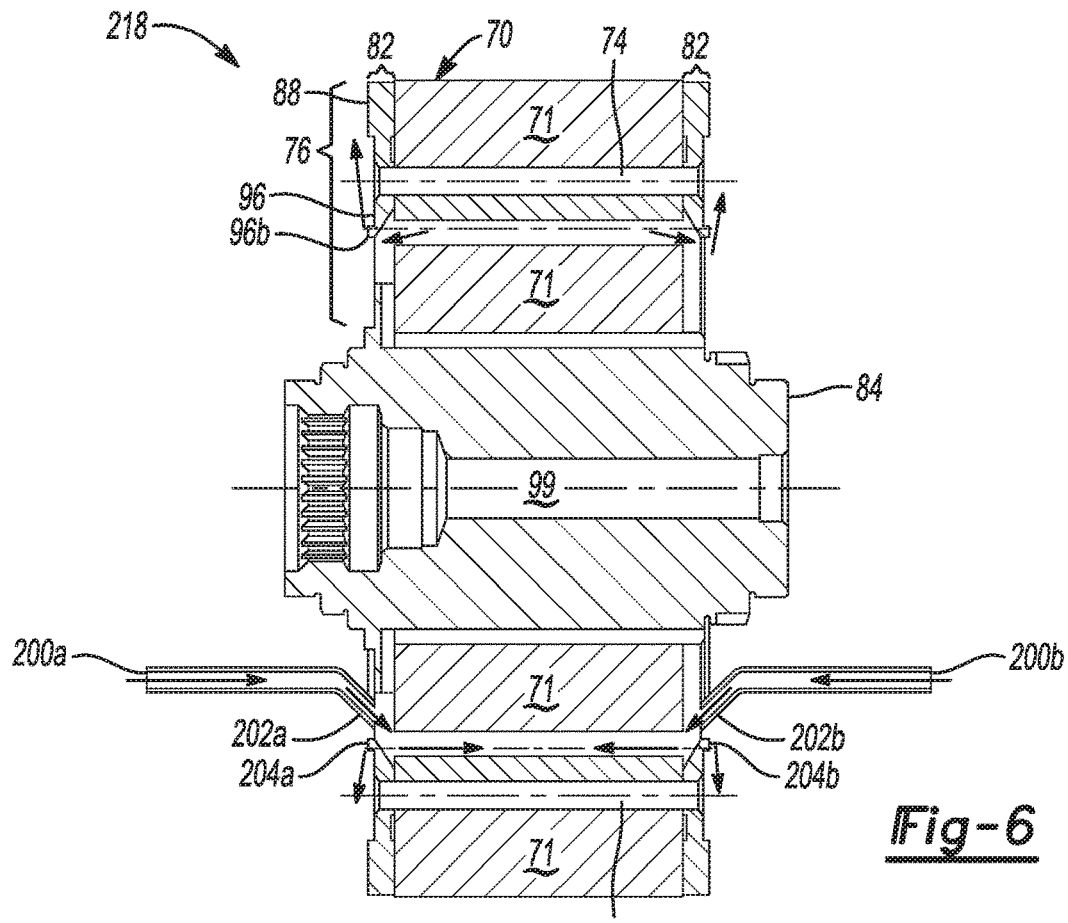
FIG. 6 is a cross-sectional view of an electric machine according to another embodiment of this disclosure.

Referring to FIGS. 5 and 6, an example electric machine 218 according to a second embodiment of this disclosure is illustrated. The electric machine 218 includes a cover 80 that extends between the endplates and encloses the internal components of the electric machine 18. A rotor 70 is disposed within the cover 80. The rotor is comprised of a plurality of laminations 71 that are fixed to a shaft 84. The rotor through the shaft 84 that is operably connected to the gearbox. When current is applied to the stator, a magnetic field is created causing the rotor 70 to spin within the stator, generating torque that is supplied to the gearbox via one or more shafts. A coolant tube 200 is connected to a nozzle 202 that is disposed within the rotor endplate 82. The coolant tube 200 provides a flow of coolant from the transmission to the nozzle 202. The nozzle 202 may have a smaller inner diameter than that of the coolant tube 200 to pressurize the fluid as it leaves the nozzle. In other embodiments, the inner diameter of the nozzle 202 may be equal to or greater than the inner diameter of the coolant tube 200. As the coolant exits the coolant nozzle 202, the coolant is sprayed into the coolant capturing ring 96 of the rotor endplate 82. As described above, the coolant capture ring 96 redirects the coolant from the coolant tube 200 to the coolant passages 74 of the rotor 70.

As the coolant travels through the coolant passage 74 from one end of the electric machine 18 to the other, the coolant capturing ring on the opposite side redirects the coolant once again. The electric machine 18 may have a coolant tube 200a and nozzle 202a, disposed on one side and a coolant tube 200b and nozzle 202b disposed on the opposite side. Disposed below the nozzle, a fluid exit aperture 204a and 204b may be disposed below the nozzles 202a and 202b. As the coolant moves from the nozzle 202a through the coolant passage 74, the coolant may come into contact with the fluid entering from the nozzle 202b. Excess coolant may flow through the coolant exit apertures 204a, 204b.

Figure 7:
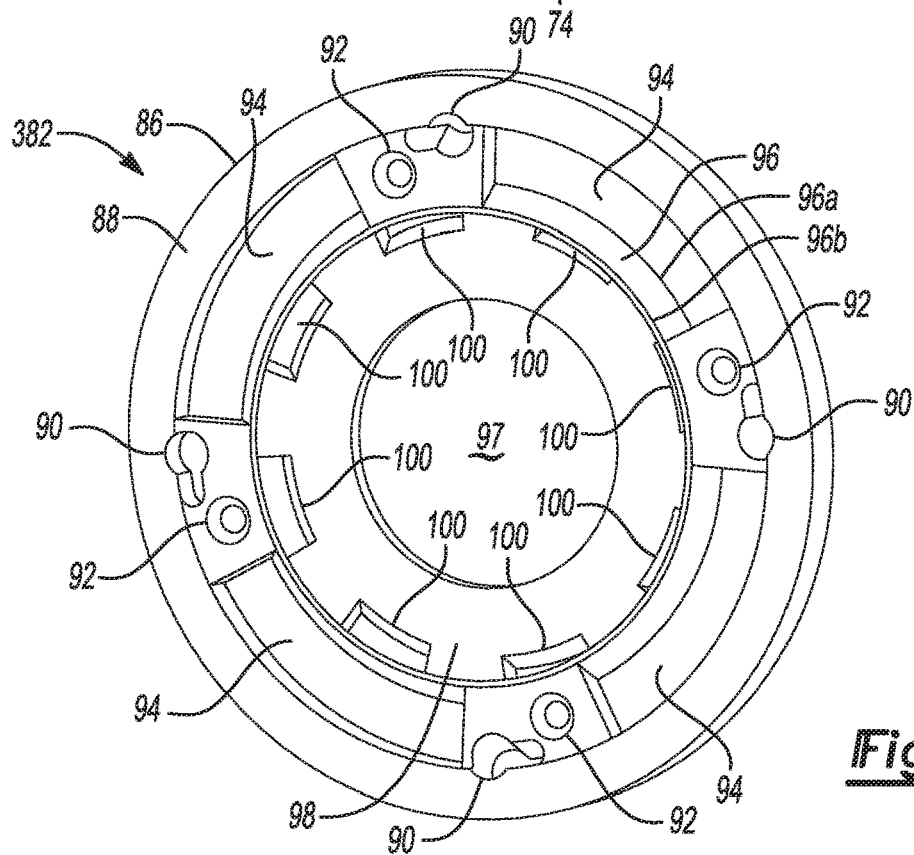
FIG. 7 is a perspective view of an example rotor endplate according to one embodiment of this disclosure.
Figure 8:
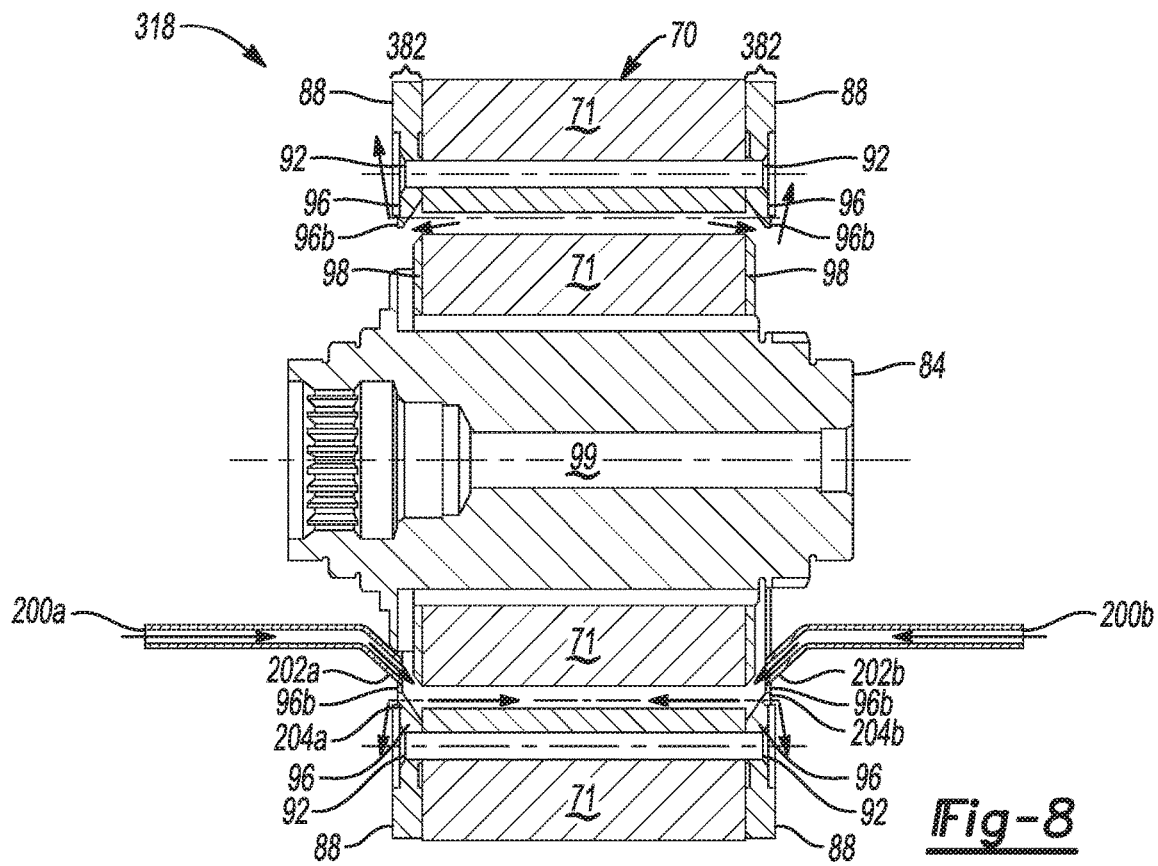
FIG. 8 is a cross-sectional view of an electric machine according to another embodiment of this disclosure.

Referring to FIG. 7, an endplate according to another embodiment of this disclosure is illustrated. The endplate 82 is similar to the endplate described in FIG. 4 but includes a centering plate 98 that extends from the base 96a of the fluid capture ring 96. The centering plate 98 includes a center aperture 97 that fits on the shaft 84 of the rotor 71. The centering plate 98 may facilitate assembling the end plate 82 to the shaft 84 and it may also provide space for part branding. The centering plate 98 includes a plurality of slots 100 that are disposed circumferentially around the center aperture 97. The slots 100 may be offset from the inner periphery or the base 96a of the fluid capture ring. The slots 100 may include tabs or protrusions extending in a direction opposite of the fluid capture ring, as shown. The slots and tabs allow coolant that is redirected by the coolant capture ring to enter the coolant passages defined by the rotor. Referring specifically to FIG. 8, a cross sectional view of an electric machine 318 is illustrated. The electric machine includes the endplate 382 that includes the centering plate 98.

Figure 9:
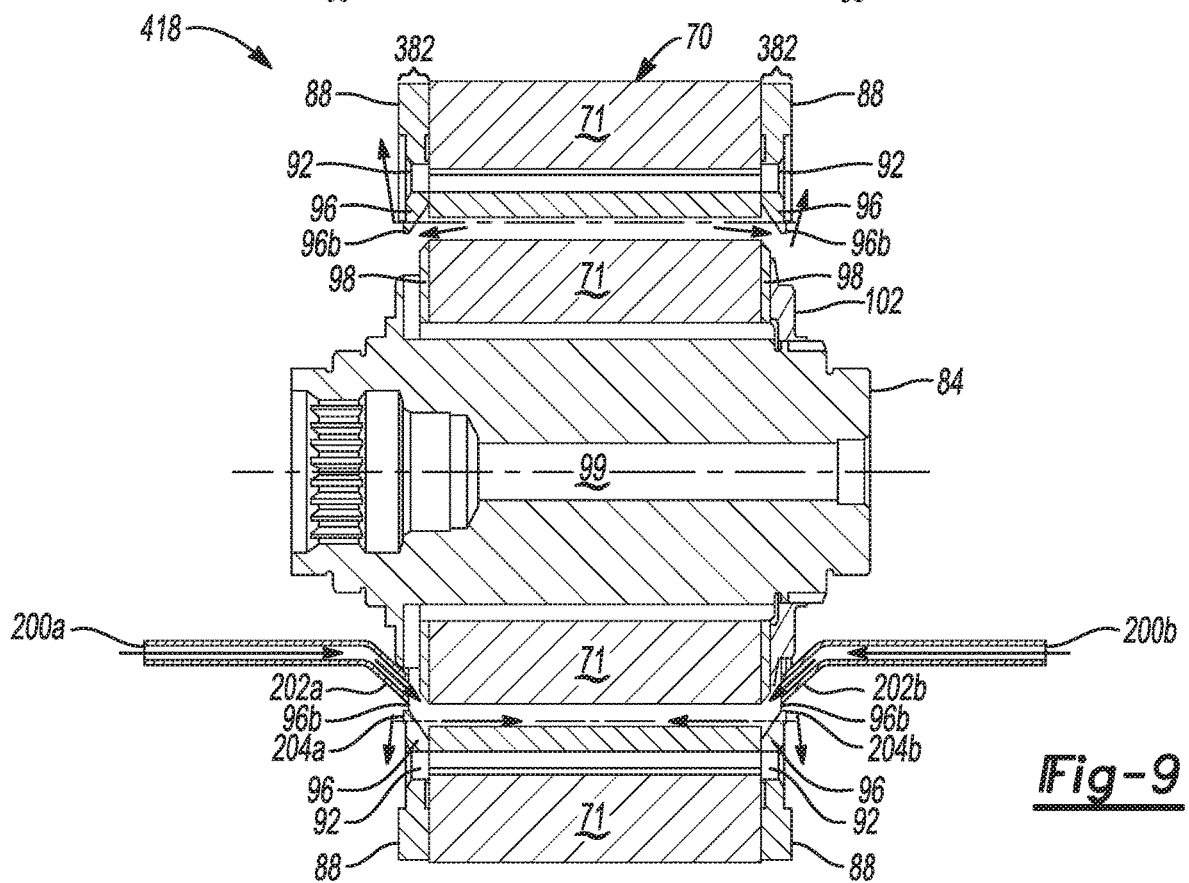
FIG. 9 is a cross-sectional view of an electric machine according to another embodiment of this disclosure.

Referring to FIG. 9, a cross sectional view of an electric machine 418 of one embodiment is shown. The electric machine 418 may include an endplate 382 that is attached to the rotor by a locknut 102. The locknut 102 may include internal threads that engage with an external thread defined by at least a portion of the external surface of the shaft 84.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric machine comprising:
   a shaft;
   a rotor formed of stack of laminations disposed on the shaft, wherein each lamination defines a coolant passage aperture and is aligned to form a coolant passage extending along a length of the shaft; and
   an endplate in direct contact with the rotor and having an inner periphery that defines a coolant capture ring having tapered side walls, that extend from an outer portion of the endplate toward the shaft, configured to deflect coolant captured by the coolant capture ring and expelled by the shaft due to centrifugal force associated with rotation of the shaft, and wherein the coolant passage terminates at the tapered sidewalls.

2. The electric machine of claim 1, wherein as the coolant enters the electric machine, the coolant capture ring is configured to direct coolant from a narrower section of the coolant capture ring to a wider portion of the coolant capture ring such that coolant flows along the coolant passage.

3. The electric machine of claim 2, wherein the coolant enters the electric machine by flowing through a horizontal channel defined by the shaft.

4. The electric machine of claim 3, wherein the coolant is expelled from the horizontal channel through a vertical channel defined by the shaft.

5. The electric machine of claim 4, wherein the horizontal channel defined by the shaft has a first diameter and the vertical channel has a second diameter, smaller than the first, and wherein the second diameter facilitates an increase in velocity of the coolant.

6. The electric machine of claim 1, wherein the endplate is attached to the rotor by at least one rivet.

7. An electric machine comprising:
   a rotor formed of a stack of laminations disposed on a shaft, wherein each lamination defines a coolant passage aperture and is aligned to form a coolant passage extending along a length of the shaft;

an endplate in direct contact with the rotor defining a coolant capture ring, having a tapered side wall, provided with a distal end, extending away from the rotor and from an outer portion of the endplate toward the shaft, at a periphery thereof; and at least one nozzle disposed within the endplate, wherein the coolant capture ring is configured to deflect coolant expelled by the nozzle along a length of the rotor.

8. The electric machine of claim 7, wherein the endplate defines a center aperture having an inner periphery and the coolant capture ring has as frustoconical shape extending from the inner periphery of the center aperture.

9. The electric machine of claim 7, wherein the coolant capture ring is angled away from the shaft by a and wherein the nozzle disposed within the endplate is angled away from the shaft by the same.

10. The electric machine of claim 7, wherein the rotor is comprised of a stack of laminations, wherein each lamination defines a coolant passage aperture and is aligned to form a coolant passage extending along a length of the shaft, and wherein the coolant passage facilitates a flow of coolant received from the coolant capture ring.

11. The electric machine of claim 7 further comprising a coolant tube terminating at the nozzle, and wherein the coolant tube has a first inner diameter and the nozzle has a second inner diameter that is less than the first inner diameter so that the second diameter pressurizes the coolant as it exits the nozzle.

12. The electric machine of claim 7, wherein the endplate is attached to the rotor by at least one rivet.

13. An electric machine comprising:
a rotor formed of a stack of laminations disposed on a shaft, wherein each lamination defines a coolant passage aperture and is aligned to form a coolant passage extending along a length of the shaft; and an endplate in direct contact with the rotor and comprising:
 a coolant capture ring including tapered side walls extending from an outer periphery towards the shaft, and
 a centering plate extending from the inner periphery and defining a plurality of slots circumferentially offset from the inner periphery, wherein the coolant capture ring is configured to redirect fluid expelled by the shaft to the plurality of slots.

14. The electric machine of claim 13, wherein as the coolant enters the electric machine, the coolant capture ring is configured to direct coolant from a narrower section of the coolant capture ring to a wider portion of the coolant capture ring such that coolant flows along the coolant passage.

15. The electric machine of claim 13, wherein the coolant enters the electric machine by flowing through a horizontal channel defined by the shaft.

16. The electric machine of claim 13 further comprising a nozzle disposed within the endplate, wherein the coolant capture ring is configured to deflect coolant expelled by the nozzle along a length of the rotor.

17. The electric machine of claim 13 further comprising a plurality of tabs extending from a portion of the plurality of slots, wherein the tabs further direct the coolant received from the fluid capture ring.

18. The electric machine of claim 13, wherein the endplate is attached to the rotor by at least one rivet.

19. The electric machine of claim 13 further comprising a lock nut threaded on the shaft to hold the endplate against the rotor.

* * * * *